United States Patent [19]

Landy

[11] Patent Number: 5,611,380
[45] Date of Patent: Mar. 18, 1997

[54] COLLAPSIBLE SUNSHADE AWNING

[75] Inventor: Richard Landy, Castaic, Calif.

[73] Assignee: Auto-Shade, L.L.C., Moorpark, Calif.

[21] Appl. No.: 565,218

[22] Filed: Nov. 30, 1995

[51] Int. Cl.$^6$ ........................................................ E04F 10/02
[52] U.S. Cl. .................. 160/76; 160/370.21; 160/DIG. 4
[58] Field of Search .............................. 160/45, 47, 59, 160/76, 77, 78, 80, 370.21, DIG. 4, DIG. 13; 135/88.01, 88.02, 88.05, 88.1, 88.13, 88.15, 90, 121, 123, 127, 139, 143; 296/95.1

[56] References Cited

U.S. PATENT DOCUMENTS

| 2,843,421 | 7/1958 | Shelton | 160/370.21 X |
|---|---|---|---|
| 2,967,732 | 1/1961 | Richardson | 160/370.21 X |
| 3,068,046 | 12/1962 | Bourgoin | 160/370.21 X |
| 3,182,672 | 5/1965 | Biller | 160/59 X |
| 3,448,748 | 6/1969 | Walrave | 135/127 |
| 3,776,590 | 12/1973 | Polidora | 160/370.21 X |
| 4,175,576 | 11/1979 | Iby | 135/88.1 |
| 4,815,784 | 3/1989 | Zheng | 160/370.21 X |
| 5,024,262 | 6/1991 | Huang | 160/370.21 X |
| 5,035,460 | 7/1991 | Huang | 160/370.21 |
| 5,116,273 | 5/1992 | Chan | 160/370.21 |
| 5,213,147 | 5/1993 | Zheng | 160/370.21 |

Primary Examiner—David M. Purol
Attorney, Agent, or Firm—Blakely Sokoloff Taylor & Zafman

[57] ABSTRACT

A collapsible awing having a flexible frame forming at least one collapsible closed loop; a flexible sheet disposed upon the frame to define a central region; and a first fastener detachably coupled to a first edge of the sheet such that the first edge is attached to a first surface; and, at least one rod with a first end coupled to a second edge of the sheet and a second end attached to a second surface through the use of a second fastener such that the sheet can provide a coveting. The flexible frame of the awning is easily collapsible for storage. The flexible sheet is an opaque flexible material which blocks sunlight and other elements. The rods can also be easily disassembled and maintained together for storage.

11 Claims, 5 Drawing Sheets

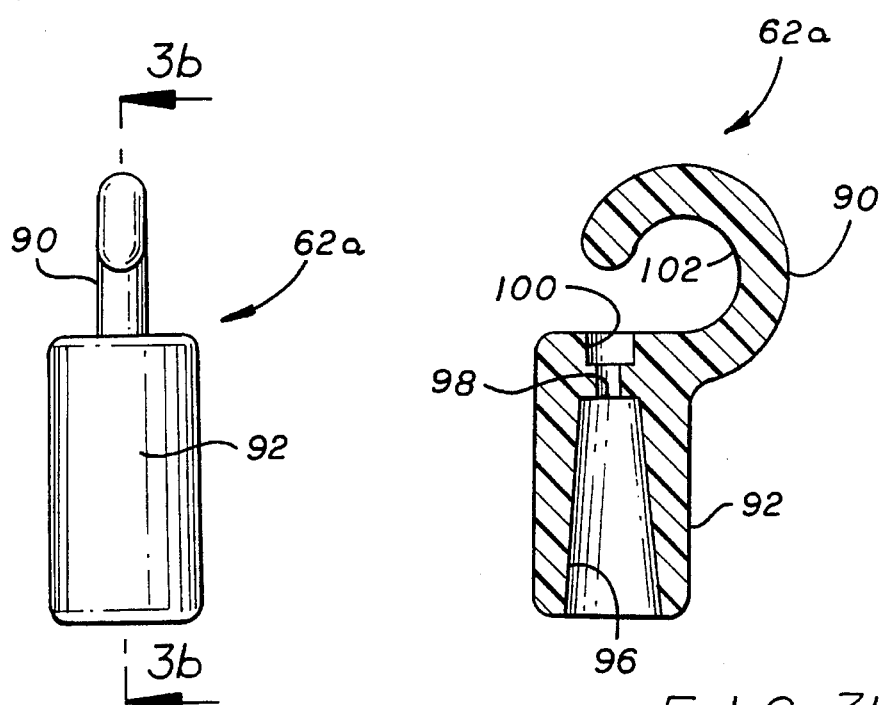
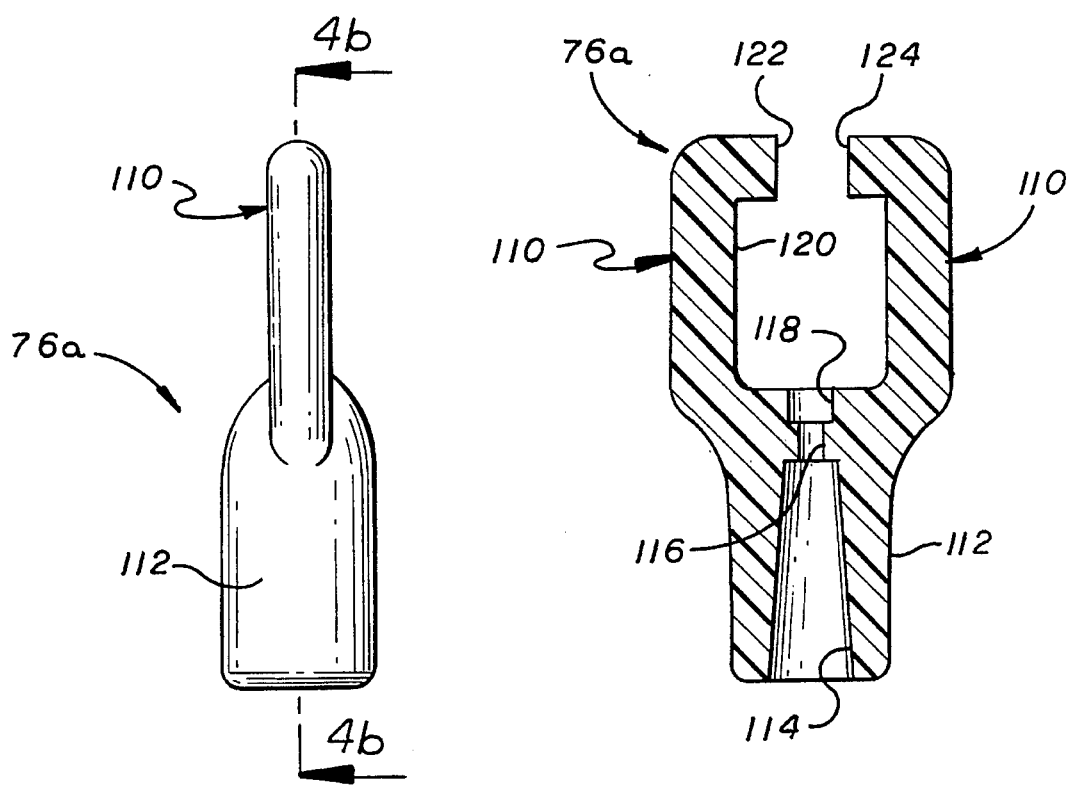
FIG. 3a
FIG. 3b
FIG. 4a
FIG. 4b

5,611,380

COLLAPSIBLE SUNSHADE AWNING

BACKGROUND OF THE INVENTION

1. Field of the Invention

The present invention relates to sunshields, and particularly to a collapsible awning apparatus capable of being removed and packed for storage.

2. Art Background

In the past, awnings have been used to shield individuals from sunlight and heat. Awnings have also been used to provide a cover for individuals from rain. These awnings are either permanently attached to a wall on a building or to a side of a recreational vehicle such as a motor home. One example of a prior art awning is composed of a fabric that is stretched out over a aluminum or steel frame mounted on a wall of a building. Unfortunately, these prior art awnings have a tendency to be very heavy and can only be mounted permanently to a surface. Additionally, these prior art awnings cannot be retracted as the frame is permanently welded at the joints.

Another example of a prior an awning is where a fabric has one side attached to a surface and the remaining portion of the fabric wrapped around a rod, with the two ends of the rod being supported by a set of poles. The ends of the set of poles that are not attached to the rod can either be mounted to the surface where the side of the fabric is attached or simply be set on a ground surface for support. Unfortunately, although these awnings can be retracted when not in use and thus can be used for applications where the surface is one side of a recreational vehicle or a large truck, these awnings are also heavy and also usually have to be permanently mounted to a surface.

In the above examples, the prior art awnings cannot be removed from one installation and installed in another without great trouble and expense. Also, the prior art awnings cannot be easily transported and attached to a vehicle that is not a motor home or a large truck. Consequently, it is desirable to have a cost efficient awning that is easily removable and collapsible for compact storage and that could be easily installed to provide protection from the sun or other elements.

BRIEF SUMMARY OF THE INVENTION

An awning is disclosed which is removable and collapsible for easy storage and is also capable of being attached to many surfaces, such as the sides of automobiles, buildings and windows, in addition to motor homes and trucks. Further, the awning can be attached to any surface on which suction cups, magnets, or other fasteners can achieve mounting. The invention thereby provides coveting to achieve the desired level of shielding from sun or rain while reducing required storage area for the covering when not in use.

The collapsible awning has a flexible frame covered with an opaque flexible material and is supported by a support structure. In one embodiment, the support structure consists of two rods and four suction cups for attaching the awning to a surface. Each of the rods have a hook on a first end for attaching to a first portion of the flexible material and a knuckle on a second end for attaching to the surface through the use of a suction cup. The other two suction cups are used to attach a second portion of the flexible material to the surface.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 3a is a side view showing a hook attachment for attaching a support rod to the collapsible awning covering.

FIG. 3b is a cut away view of the hook attachment of FIG. 3a.

FIG. 4a is a side view showing a knuckle attachment for attaching a rod to a suction cup.

FIG. 4b is a cut away view of the knuckle attachment of FIG. 4a.

DETAILED DESCRIPTION OF THE INVENTION

The present invention provides a collapsible awning. For purposes of explanation, specific embodiments are set forth to provide a thorough understanding of the present invention. However, it will be understood by one skilled in the art, from reading this disclosure, that the invention may be practiced without these details. Moreover, well-known elements, devices, process steps and the like are not set forth in detail in order to avoid obscuring the present invention.

Figure 1:
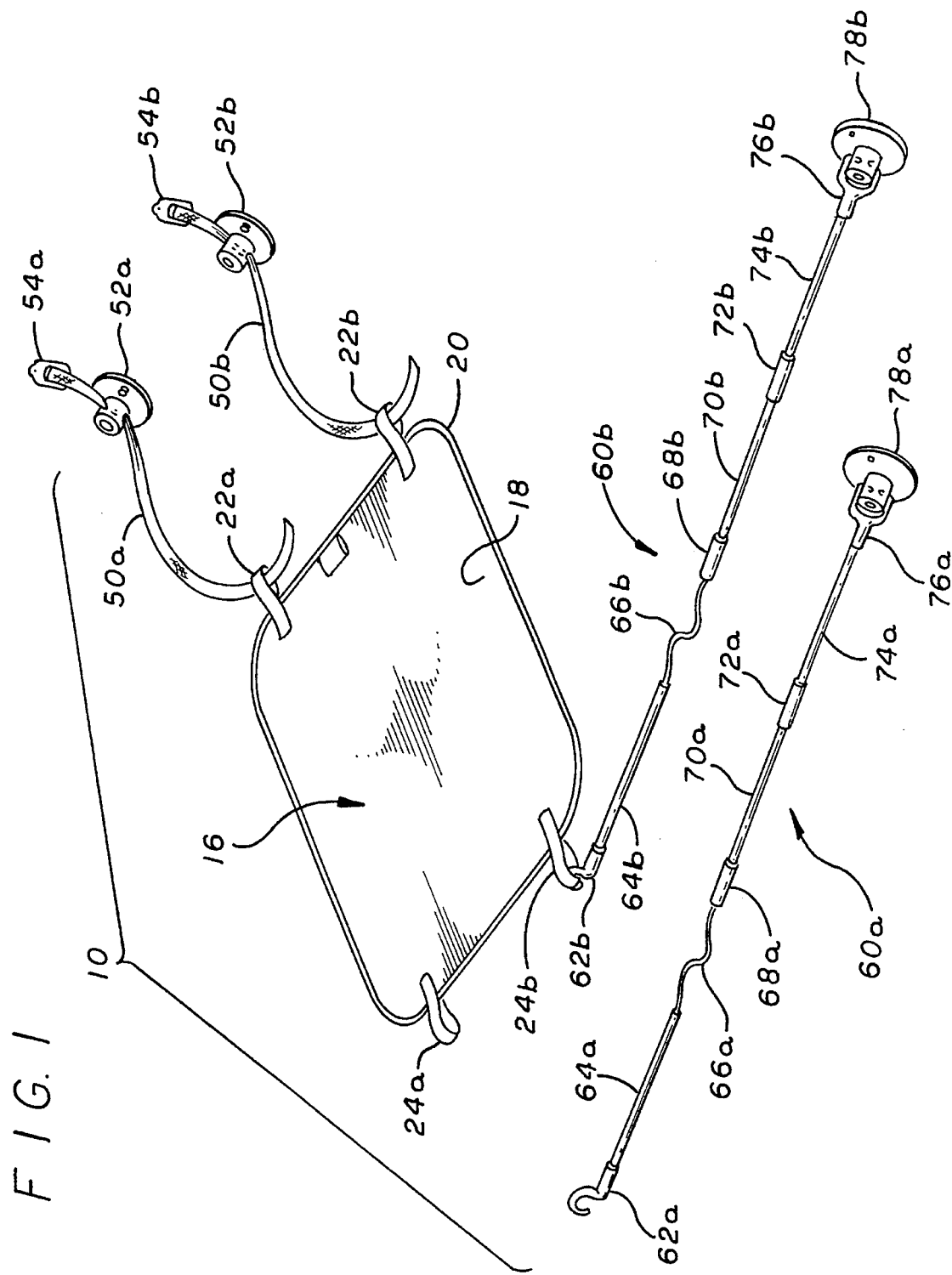
FIG. 1 is an exploded view of an exemplary embodiment of an awning assembly of the invention.

FIG. 1 shows an awning assembly 10 having an awning covering 16 which includes a flexible fabric sheet 18 attached to a flexible frame 20. Flexible frame 20 is formed by a strip that is bent into a closed loop and joined together by a clip or other fastening means. In addition, the strip is composed of a spring-like metal or plastic material that can be readily twisted and folded without breaking. In one embodiment of the present invention, flexible fabric frame 20 is constructed from steel wire, which is both flexible and strong.

Flexible fabric sheet 18 is typically constructed from a woven fabric that is both flexible and strong. The material is typically strong enough to hold the frame in the desired configuration. Alternatively, flexible fabric sheet 18 may be constructed from a thin plastic, reinforced paper, plasticized metal foil or a materials sold by E.I. du Pont de Nemour Inc., under the trademark TYVEK® and MYLAR®. Flexible fabric sheet 18 may also be constructed from a plurality of individual sheets laminated together. In addition, flexible fabric sheet 18 may be adapted to reflect light. Furthermore, flexible fabric sheet 18 may include various colors, patterns, or logos to improve the appearance of the shade.

Continuing to refer to FIG. 1, awning covering 16 also has four loops 22a, 22b, 24a and 24b. Loop 22a is used to attach a suction cup 52a to awning coveting 16 through the use of a strap 50a and a buckles 54a. Similarly, loop 22b is used to attach a suction cup 52b to awning coveting 16 through the use of a strap 50b and a buckles 54b. Loop 24a is used to attach a suction cup 78a, which is connected to a knuckle attachment 76a on a rod 60a, to awning covering 16 through the use of a hook attachment 62a on rod 60a. Similarly, loop 24b is used to attach a suction cup 78b, which is connected to a knuckle attachment 76b on a rod 60b, to awning coveting 16 through the use of a hook attachment 62b on rod 60a.

A free end of strap 50a passes through a hole in suction cup 52a, loop 22a, and is secured through the use of buckle 54aSimilarly, a free end of strap 50b passes through a hole in suction cup 52b, loop 22b, and is secured through the use of buckle 54b. Alternatively, straps 50a and 50b can be assembled through the use of a hook and loop type fastener (such as Velcro®) on each strap, thereby eliminating the need to use buckles 54a and 54b, respectively. For example, one end each of straps 50a and 50b can be a hook type fastener while the other end each of straps 50a and 50b can be a loop type fastener such that the end with the hook type fastener of each of straps 50a and 50b can be attached to the end with the loop type fastener after straps 50a and 50b are wrapped around a pole or a roof rack.

It is to be noted that in alternate embodiments, suction cups 52a and 52b are not needed to achieve proper mounting of awning covering 16. As described below, awning covering 16 can be mounted to poles or roof racks through the use of straps 50a and 50b alone. In these cases, the free end of strap 50a would wrap around a pole or rod, pass through loop 22a, and be secured through the use of buckle 54a. Similarly, the free end of strap 50b would wrap around a pole or rod, pass through loop 22b, and be secured through the use of buckle 54b.

Rod 60a is comprised of a rod segment 64a connected to a rod segment 70a, which in turn is connected to a rod segment 74a, through the use of two sheaths 68a and 72a, respectively. Hook attachment 62a is connected to rod segment 64a, and knuckle attachment 76a is attached to rod segment 74a. In a preferred embodiment, rod segments 64a, 70a and 74a are hollow so as to allow an elastic cord 66a to be threaded through them. Elastic cord 66a is shorter than the combined lengths of rod segments 64a, 70a and 74a, so that, after assembly, the tension in elastic cord 66a prevents rod segments 64a, 70a, and 74a from separating. Sheaths 68a and 72a, which are attached to rod segments 70a and 74a, respectively, are used to provide radial support for rod segments 64a and 70a, respectively, when rod segments 64a and 70a are inserted into sheaths 68a and 72a, respectively. As rod segments 64a and 70a are not fixedly attached to sheaths 68a and 72a, respectively, rod segments 64a and 70a can be pulled out of sheaths 68a and 72a, respectively, and bent at the joints of rod segments 64a and 70a, and rod segments 70a and 74a. Hook attachment 62a and knuckle attachment 76a is similarly removable from rod segments 64a and 74a, respectively.

The elastic cords 66a and 66b are secured by one end each of elastic cord 66a and 66b being passed through hook attachments 62a and 62b, another end each of elastic cord 66a and 66b being passed through knuckle attachment 76a and 76b, then with all ends being knotted, as described below. It is noted that even though rod segments 64a, 70a and 74a can be separated, they are still attached by elastic cord 66a. This provides for easy disassembly and storage without fear of losing a particular part.

Rod 60b, comprising the parts of: a hook attachment 62b, a rod segment 64b, an elastic cord 66b, a sheath 68b, a rod segment 70b, a sheath 72b, a rod segment 74b, and a knuckle attachment 76b; is configured as described for rod 60a, above.

Figure 7:
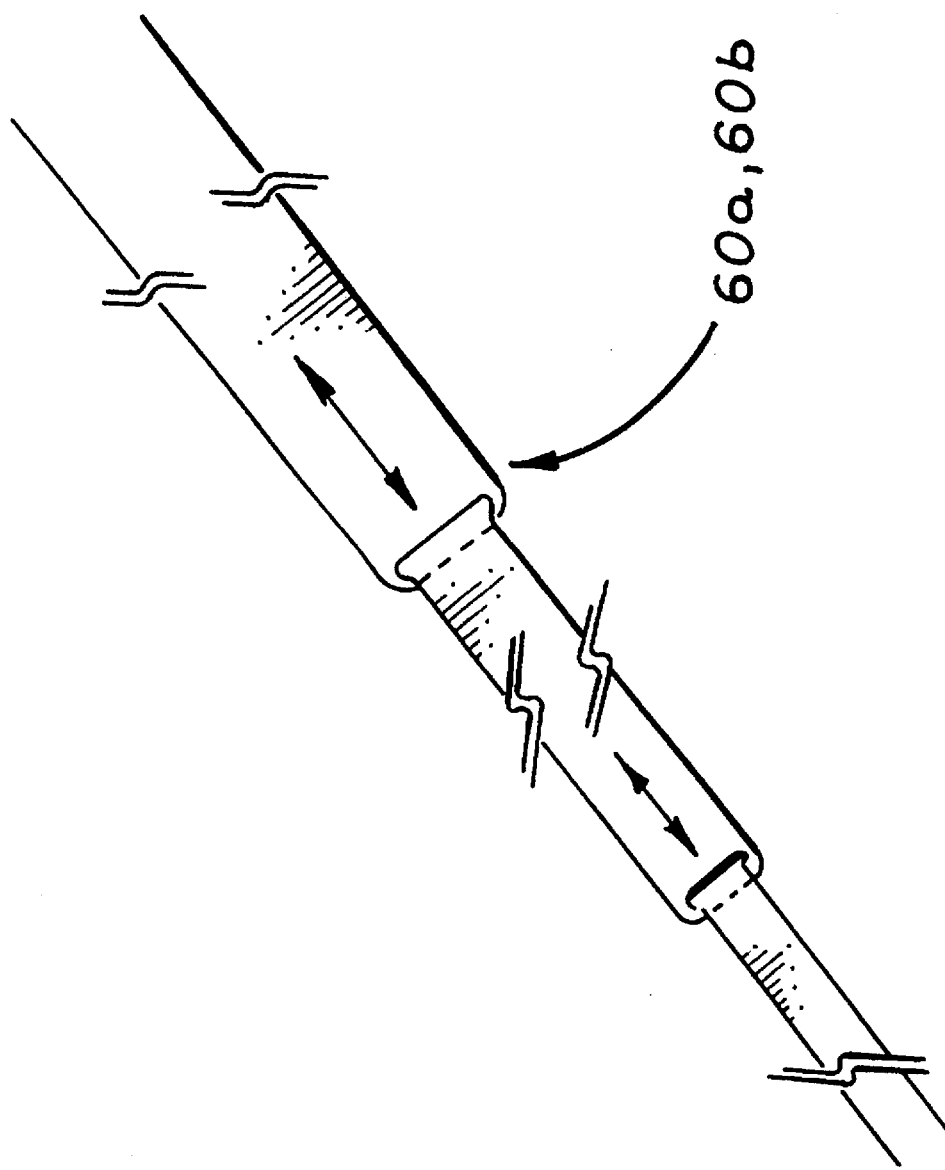
FIG. 7 is a cutaway view of another embodiment of the support rod.

In an alternate embodiment, for both rods 60a and 60b, each rod segment can be joined to the next through the use of a threaded end on one rod segment that screws into a threaded receptacle on another rod segment. In still another embodiment, as shown in FIG. 7, rods 60a and 60b can be telescopic in configuration such that rods 60a and 60b are formed of concentric tubes of metal, wherein each tube has a diameter larger than the next. In yet another embodiment, rods 60a and 60b can be jointed so that they can be folded. Moreover, rods 60a and 60b can be made of one solid piece of material. In addition, in cases where an embodiment has more than one separate wire frame being contained in awning covering 16, additional rods can be used to provide support for the additional frames.

Rods 60a and 60b is constructed of steel in one embodiment, but can also be constructed of plastic, other metals such as aluminum, or even organic material such as wood. All that is required is that rods 60a and 60b are made of a material that is rigid in nature.

Suction cups 52a, 52b, 78a and 78b are constructed of a silicate material. In an alternate embodiment, any other flexible materials such as plastic composites or rubber may be used. All that is required is that the material used provide enough elasticity for achieving a good suction. Additionally, instead of using suction cups, magnets can be used to secure awning assembly 10. Also, the suction cups and magnets are not necessary for attachment if the mounting is to be to a pole or a roof rack, as described above.

Figure 2:
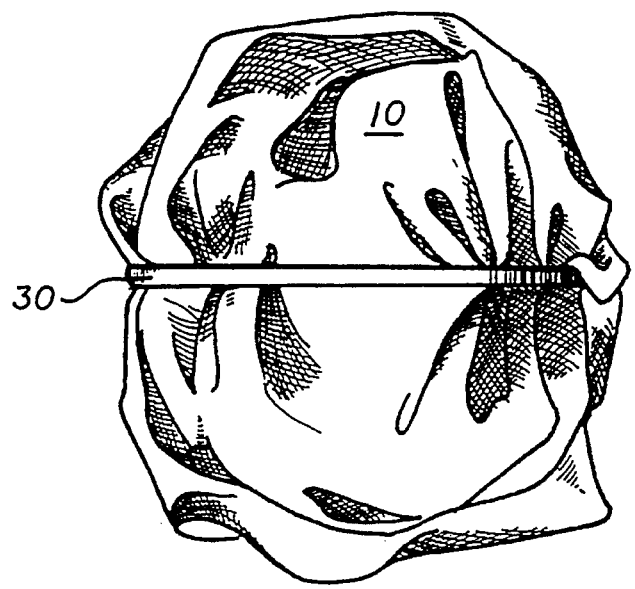
FIG. 2 is a perspective view showing a collapsible awning cover of the awning assembly of the invention collapsed for compact storage.

FIG. 2 presents one view of awning covering 16 where it has been collapsed by twisting the ends of flexible frame 20 in opposite directions while folding the awning inward until three interleaved circular loops are formed. In this fashion, the awning will typically collapse to a fraction of the original size. In addition, the awning generally remains in the collapsed condition without further restraint. However, awning coveting 16 includes an elastic strap 30 that wraps around the shades in the collapsed condition to prevent the frame from unfolding. Collapsed awning covering 16 can then be placed in a pouch (not shown) or other storage container. A more detailed description of the collapsible feature can be found in U.S. Pat. No. 4,815,784, which is incorporated herein by reference.

FIG. 3a illustrates a side view of hook attachment 62a with a hook portion 90 and a shaft portion 92. FIG. 3b shows a cut away view of hook attachment 62a with a rod segment receptacle 96, a elastic cord passage 98 and a knot holder 100 along with an inner hook surface 102. Also referring again to FIG. 1, rod segment receptacle 96 is used to hold rod segment 64a. As described before, one end of elastic cord 66a passes through elastic cord passage 98 and is knotted. That knot (not shown) rests in knot holder 100. In an alternate embodiment, such as in the case of each rod segment being joined to the next through the use of a threaded end on one rod segment which screws into a threaded receptacle on another rod segment, rod segment receptacle 96 would have a threaded surface for receiving a threaded end of a rod segment. In that alternate embodiment, elastic cord passage 98 and knot holder 100 would be unnecessary. Hook attachment 62b is configured identically to hook attachment 62a, and thus the description for hook attachment 62a applies equally to hook attachment 62b. Hook attachment 62a and hook attachment 62b are constructed out of plastic composites, but can be made out metal or any other rigid material such as wood or fiberglass.

It is to be noted that hook attachments 62a and 62b are not essential and, in alternate embodiments, other methods of attaching rods 60a and 60b may be employed. For example, instead of using a hook attachment, a spring-loaded clip or clamp can be used. Alternatively, awning covering 16 can have a receptacle for accepting a tip of a rod.

FIG. 4a illustrates a side view showing knuckle attachment 76a with a knuckle portion 110 and a shaft portion 112. FIG. 4b shows a cut away view of knuckle attachment 76a with a rod segment receptacle 114, a elastic cord passage 116 and a knot holder 118 along with an inner knuckle surface 120, a first prong 122 and a second prong 124. Also referring again to FIG. 1, rod segment receptacle 114 is used to hold rod segment 74a. As described before, another end of elastic cord 66a passes through elastic cord passage 116 and is knotted. This second knot (not shown) rests in knot holder 118. In an alternate embodiment, such as in the case of each rod segment being joined to the next through the use of a threaded end on one rod segment which screws into a threaded receptacle on another rod segment, rod segment receptacle 114 would have a threaded surface for receiving a threaded end of a rod segment. In that alternate embodiment, elastic cord passage 116 and knot holder 118 would be unnecessary.

As shown in FIG. 4a and FIG. 4b, knuckle attachment 76a has knuckle portion 110 with first prong 122 and second prong 124 defining inner knuckle surface 120 as a "C" shaped surface. Referring again to FIG. 1, suction cup 78a is attached to knuckle portion 110 by first prong 122 and second prong 124 resting in a first indentation and a second indentation of suction cup 78a. This arrangement allows suction cup 78a room to pivot partially around the axis defined by first prong 122 and second prong 124. Alternatively, suction cup 78a and knuckle attachment 76a can be made out of one unit. Knuckle attachment 76b is configured identically to knuckle attachment 76a, and thus the description for knuckle attachment 76a applies equally to hook attachment 76b. Knuckle attachment 76a and knuckle attachment 76b are constructed out of plastic composites, but can be made out of metal or any other rigid material such as wood or fiberglass.

There can be many alternatives to the use of knuckle attachments 76a and 76b to attach suction cup 78a and 78b to rods 60a and 60b, respectively. For example, a universal joint can be used as the connector between a suction cup and a rod. Also, the rod can be directly attached to a suction cup, with the rod attaching to the suction cup at an angled so that proper mounting angle can be achieved for the rod without breaking the suction.

Figure 5:
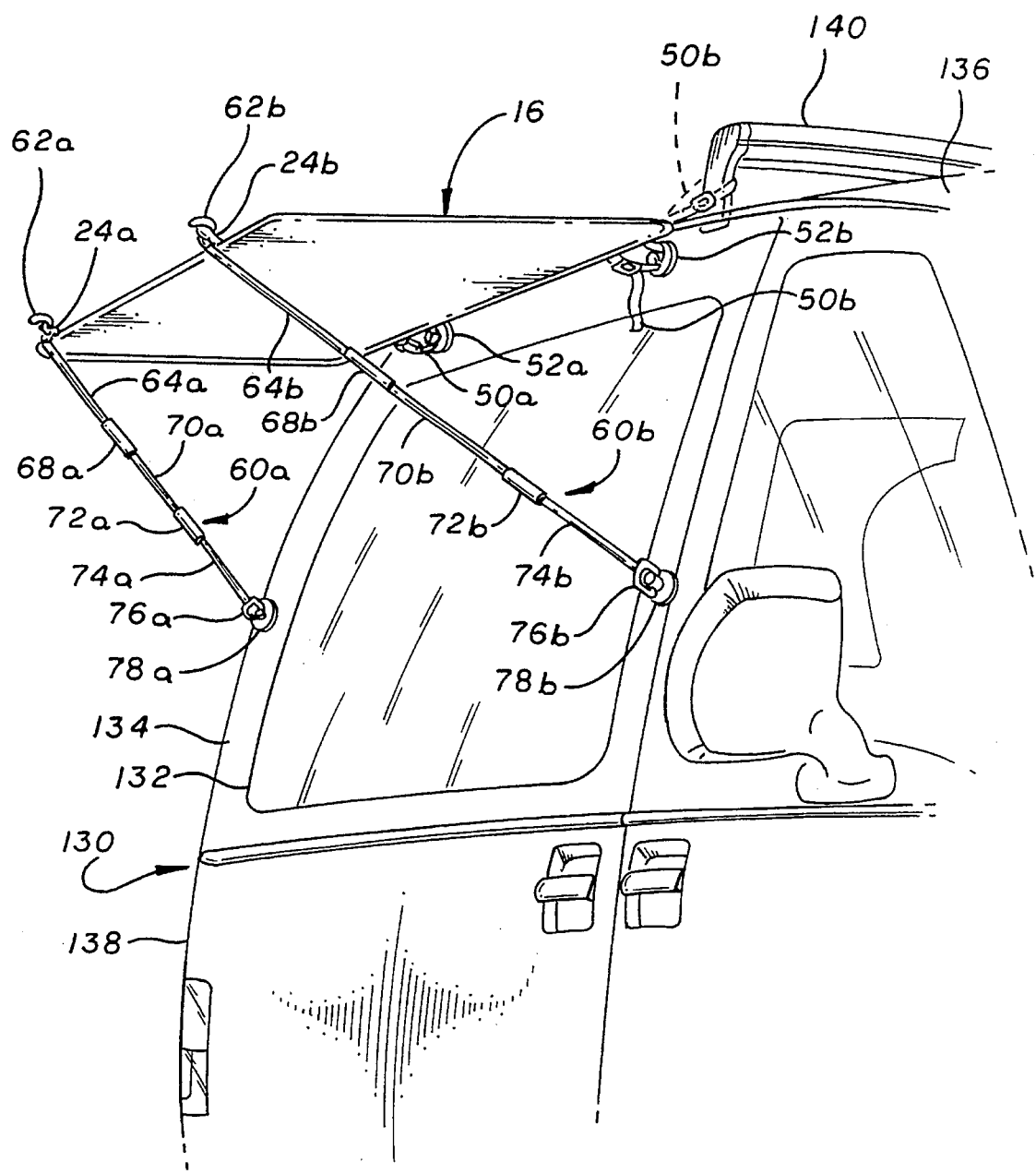
FIG. 5 is an installed view of the awning assembly of FIG. 1 showing the results of a first method of installation onto a side of an automobile.

FIG. 5 is an installed view of awning assembly 10 of FIG. 1 showing a first use of awning assembly 10 on a side 134 of an automobile 130 having a window 132 in side 134, a top side 136 and a back side 138. Suction cup 52a and 52b are first attached to awning covering 16 though the use of straps 50a and 50b, buckles 54a and 54b, and loops 22a and 22b, respectively. Suction cup 52a and 52b are then attached to side 134 of automobile 130 by applying the cup side of suction cups 52a and 52b to a pre-determined position on side 134 and applying pressure so as to empty the air out of the cup portions of suction cups 52a and 52b, respectively. Straps 50a and 50b are adjustable such that adjustment of the straps 50a and 50b changes the angle of the awning without detaching the suction cups. It is to be noted that suction cups 52a and 52b can also be attached to either top side 136 or window 132 of automobile 130.

Rod 60a is assembled by inserting rod segments 64a and 70a into sheaths 68a and 72a, respectively. Also, rod segments 64a and 74a are inserted into rod segment receptacle 96 of hook attachment 62a and rod segment receptacle 114 of knuckle attachment 76a, respectively. If needed, suction cup 78a will be attached to knuckle attachment 76a through the insertion of first prong 122 and second prong 124 of knuckle attachment 76a into first indentation and second indentation of suction cup 78a. Rod 60b is similarly assembled and connected to suction cup 78b. After rods 60a and 60b are assembled, they are attached to side 134 of vehicle 130 by applying the cup side of suction cups 78a and 78b to a pre-determined position on side 134 and applying pressure so as to empty the air out of the cup portions of suction cups 78a and 78b, respectively. In an alternate installation, suction cups 78a and 78b can be attached to window 132 of automobile 130. Additionally, suction cup 78a can be attached to back side 138 of automobile 130. It is to be noted that any or all the suction cups can be attached to different surfaces, such as when awning assembly 10 is to be attached to the back of a vehicle, in which case suction cups 52a and 52b can be attached to a top side of the vehicle and suction cups 78a and 78b can each be attached to a different side of the vehicle.

Moreover, in still another alternate installation, such as the case as in FIG. 5 where automobile 130 has a first part of roof rack 140 for holding skis or other baggage, strap 50b can be wrapped around first part of roof rack 140 without the use of suction cup 52b (as shown by dotted line 50b). Similarly, strap 50a can also be attached to a second part of roof rack 140 (not shown) in the same fashion, thereby eliminating the use of suction cub 52a.

Lastly, awning covering 16 is attached to red 60a by first threading hook attachment 62a of rod 60a through loop 24a of awning covering 16 such that a portion of loop 24a is resting in inner hook surface 102 of hook attachment 62a. Awning covering 16 is attached to rod 60b in a similar fashion. A portion of the weight of awning covering 16 is supported by its attachment to suction cups 52a and 52b. The other portion of the weight of awning covering 16 is supported by rods a and 60b.

Figure 6:
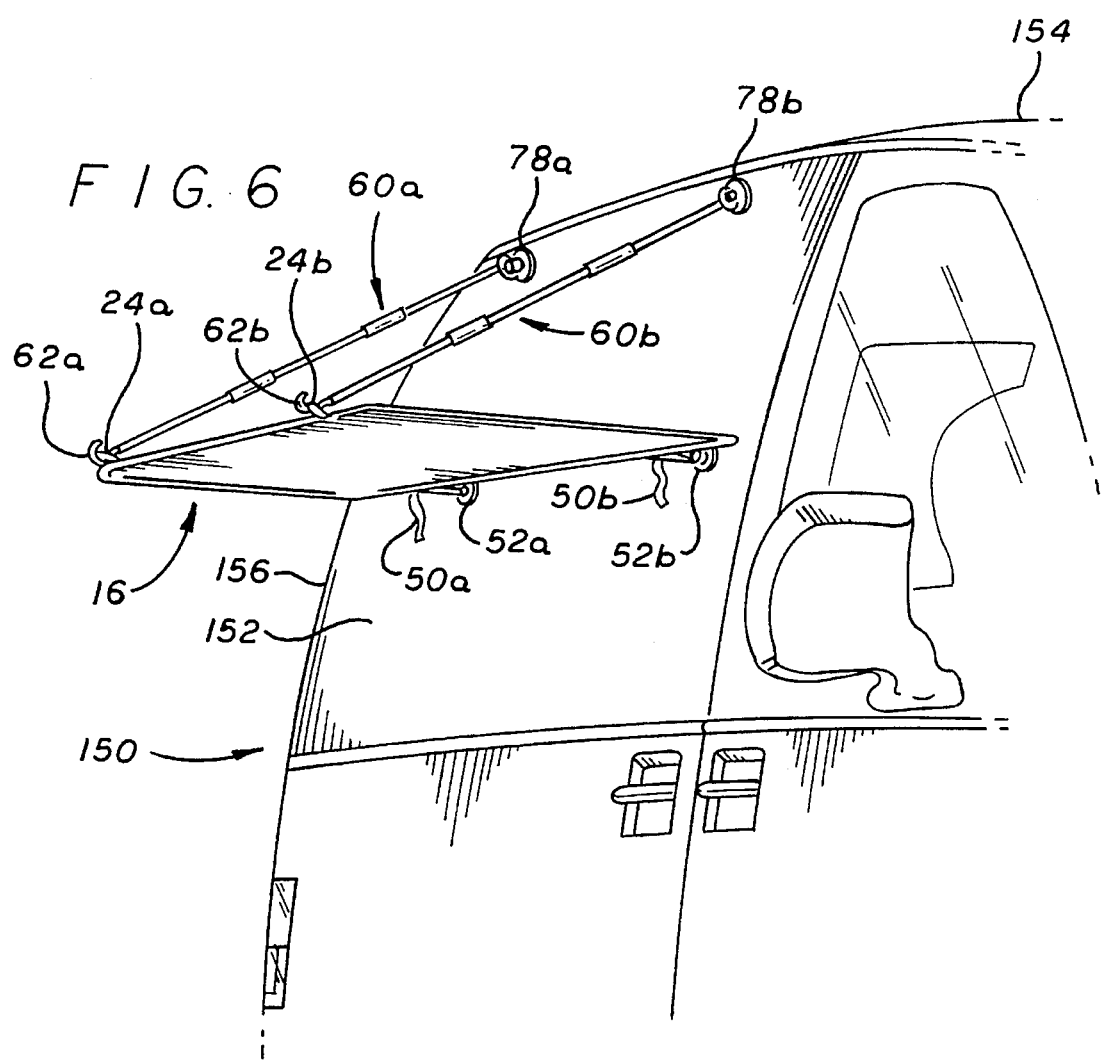
FIG. 6 is another installed view of the awning assembly of FIG. 1 showing the results of a second method of installation onto the same side of the automobile.

FIG. 6 illustrates another installed view of awning covering 16 on a side 152 of another automobile 150 where awning covering 16 has been installed with the weight of awning covering 16 being supported by suction cups 52a and 52b, and rods 60a and 60b. Rods 60a and 60b are assembled as described above and is attached to awning covering 16 through the use of hook attachments 62a and 62b, respectively. A portion of each loops 24a and 24b rests in inner hook surface 102 of hook attachment 62a and the inner hook surface of hook attachment 62b. It is noted that suction cups 78a and 78b can be attached to a top side 154 of automobile 150. Alternatively, suction cup 52a can also be attached to a back side 156 of automobile 150. It is also within the scope and contemplation of the invention that the rods 60a and 60b could be permanently attached to a portion of each of loops 24a and 24b. In this embodiment, the hooks 62a and 62b may be replaced with eyelets having loops 24a and 24b passed through the eyelets before being affixed to flexible sheet 16.

While certain exemplary embodiments have been described in detail and shown in the accompanying drawings, it is to be understood that such embodiments are merely illustrative of and not restrictive of the broad invention and that this invention not be limited to the specific construction and arrangements shown and described, since various other modifications may occur to those ordinarily skilled in the art. Therefore, the scope of the instant invention should only be limited by the appended claims.

I claim:

1. A collapsible awning for temporary attachment to a structure comprising:

a flexible frame forming at least one collapsible closed loop;

a flexible sheet disposed upon the frame to define a central region;

at least one fastener detachably coupled to a first portion of the sheet such that the first portion is detachably attached to the structure; and, at least one rod with a first end detachably coupled to a second portion of the sheet, wherein the first end of the rod includes a hook, and a second end coupled to a second fastener detachably attached to a second surface such that the sheet can provide a covering.

2. The collapsible awning of claim 1 wherein the first portion is located at a first location on an edge of the sheet and the second portion is located at a second location on the edge of the sheet.

3. The collapsible awning of claim 1 wherein the fastener is detachably coupled to the first portion of the sheet by a strap connected to a first loop disposed on the sheet.

4. The collapsible awning of claim 1 wherein the first fastener is a first suction cup.

5. The collapsible awning of claim 1 wherein the detachable coupling between the first end of the rod and the second portion of the sheet is formed by the hook on the first end of the rod threaded through a second loop disposed on the sheet.

6. The collapsible awning claim 1 wherein the second end of the rod is detachably coupled to a second suction cup.

7. The collapsible awning of claim 6 wherein the detachable coupling between the second end of the rod and the suction cup is formed by a knuckle assembly.

8. The collapsible awning of claim 1 wherein the rod is comprised of a first segment detachably coupled to a second segment.

9. The collapsible awning of claim 8 wherein the detachable coupling between the first segment and the second segment of the rod includes:

a sheath attached to a first end of the first segment; and, an elastic cord threaded through the sheath and attached to the first end of the first segment and a first end of the second segment such that the first end of the second segment can be inserted into the sheath so as to form a rigid tubular structure.

10. The collapsible awning of claim 1 wherein the rod is telescopic.

11. The collapsible awning of claim 1 wherein the rod can be folded.

* * * * *

UNITED STATES PATENT AND TRADEMARK OFFICE
CERTIFICATE OF CORRECTION

| | | |
|---|---|---|
| PATENT NO. | : | 5,611,380 |
| DATED | : | March 18, 1997 |
| INVENTOR(S) | : | Landy |

It is certified that error appears in the above-identified patent and that said Letters Patent is hereby corrected as shown below:

In item [57] Abstract at line 1, please delete " awing " and insert -- awning --.

In item [57] Abstract at line 8, column 1 at line 55, column 2 at line 66, column 3 at lines 1 and 8, and column 4 at line 39, please delete " coveting " and insert -- covering --.

In column 1 at line 24, please delete " an " and insert -- art --.

In column 3 at line 12, please delete " 54aSimilarly " and insert -- 54a.  Similarly --.

In column 6 at line 31, please delete " red " and insert -- rod --.

In column 6 at line 39, please delete " a " and insert -- 60a --.

Signed and Sealed this

Seventh Day of October, 1997

BRUCE LEHMAN

*Attest:*

*Attesting Officer*

*Commissioner of Patents and Trademarks*